US012670774B2

(12) United States Patent
Britt et al.

(10) Patent No.: US 12,670,774 B2
(45) Date of Patent: Jun. 30, 2026

(54) DETERMINING ITEM QUANTITY AT CHECKOUT

(71) Applicant: NCR Voyix Corporation, Atlanta, GA (US)

(72) Inventors: Judea Britt, Atlanta, GA (US); Ajay Gill, Atlanta, GA (US); Adam Gunn, Atlanta, GA (US); Vani Gupta, Atlanta, GA (US); Kip Oliver Morgan, Atlanta, GA (US); Lyndon Arthur Puzon, Atlanta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 274 days.

(21) Appl. No.: 18/401,539

(22) Filed: Dec. 31, 2023

(65) Prior Publication Data

US 2025/0218257 A1 Jul. 3, 2025

(51) Int. Cl.
*G07G 1/00* (2006.01)
*G06T 7/50* (2017.01)
*G06V 20/52* (2022.01)
*G06V 20/64* (2022.01)

(52) U.S. Cl.
CPC ............. *G07G 1/0036* (2013.01); *G06T 7/50* (2017.01); *G06V 20/52* (2022.01); *G06V 20/64* (2022.01); *G06T 2207/10028* (2013.01); *G06T 2207/10048* (2013.01); *G06T 2207/30242* (2013.01)

(58) Field of Classification Search
None
See application file for complete search history.

(56) References Cited

U.S. PATENT DOCUMENTS

| | | | |
|---|---|---|---|
| 10,586,208 B2 | 3/2020 | Buibas et al. | |
| 12,511,684 B2 * | 12/2025 | Morgan | ............. G06Q 30/0643 |
| 2013/0182904 A1 | 7/2013 | Zhang et al. | |
| 2016/0140397 A1 * | 5/2016 | Zhang | ..................... G06T 7/246 |
| | | | 382/103 |

(Continued)

FOREIGN PATENT DOCUMENTS

JP 2017146854 8/2017

OTHER PUBLICATIONS

"European Application Serial No. 24211691.1, Extended European Search Report mailed Apr. 24, 2025", 10 pgs.

(Continued)

*Primary Examiner* — Dov Popovici
(74) *Attorney, Agent, or Firm* — Schwegman Lundberg & Woessner, P.A.

(57) ABSTRACT

A depth image of items on a scale are captured. Depth information for the depth image is processed to produce a three-dimensional (3D) map of the depth information. The items are identified as blobs within the 3D map. A plane is generated and projected into the 3D map and each separate blob that intersects the plane is counted to determine an item quantity for the items depicted in the original depth image. The item quantity is provided back to a terminal for item quantity verification of the items during a checkout transaction at the terminal. In an embodiment, the plane is projected onto the 3D map and animated to move from a top of the 3D map to a bottom of the 3D map while the separate blobs are counted for the item quantity determination as the plane moves.

20 Claims, 7 Drawing Sheets

100

(56)          References Cited

U.S. PATENT DOCUMENTS

2016/0196468 A1      7/2016  Hoof et al.
2018/0018788 A1*     1/2018  Olmstead .................. G06T 7/50
2023/0071821 A1      3/2023  Noh
2023/0252609 A1      8/2023  Mcdaniel et al.

OTHER PUBLICATIONS

"European Application Serial No. 24211691.1, Communication
Pursuant to Article 943 EPC mailed Nov. 6, 2025", 14 pgs.

* cited by examiner

200

DETERMINING ITEM QUANTITY AT CHECKOUT

BACKGROUND

Checkouts include many time-intensive tasks that slow transaction throughput. For example, often customers place produce in bags while shopping and during checkout the quantity in the bags must be determined. This slows down the transaction as customers have to carefully determine how many produce items are in their bags. Furthermore, customers can lie or make mistakes when entering their item quantities during self-checkouts causing shrink for the retailers. Retail produce bags may also not provide clear visibility of the items the customers placed in the bags while shopping, which means customers have to open the bags to properly count the items.

DETAILED DESCRIPTION

Figure 1A:
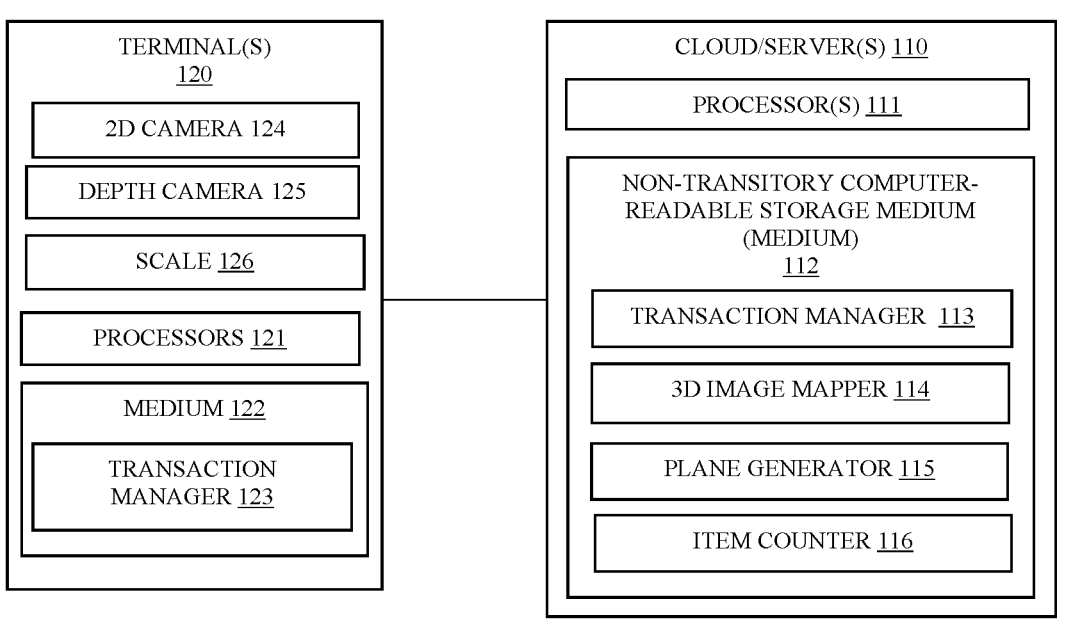
FIG. 1A is a diagram of a system for determining item quantity at checkout, according to an example embodiment.

As stated above, item counting is a checkout activity which decreases transaction throughput, is ripe for fraud, and is fraught with errors. This is especially true when the items are in bags during checkout, often the bags are not completely transparent which means conventional images from conventional cameras are unable to discern how many items are in the bags and must therefore rely on the item quantity entered by the customer. Furthermore, conventional images captured by conventional two-dimensional (2D) cameras usually do not have enough image information for accurate item quantity determinations.

Consequently, conventional approaches have attempted to rely on the collective weight of the items when placed on the checkout scale for item quantity verification, but weights of even a same type of item can vary. As a result, item weight-based verifications have proved unsuccessful in reducing item quantity errors during checkouts.

These issues are solved with the teachings presented herein and below. A checkout terminal is equipped with depth sensing or an infrared enabled camera in addition to any 2D camera of the checkout terminal. A depth image and/or a 2D image depicting the items placed on a scale and, optionally, items placed within a bag on the scale are processed to produce a three-dimensional 3D map of the items. The 3D image map is processed to draw a best fit plane through the objects representing the items. Each separate item appears as an image blob that intersects the plane projected onto the 3D image map. The separate blobs intersecting the plane are then counted. In an embodiment, which accounts for overlapping items within a bag, a projected plane starts vertically at a top of the 3D image map and moves downward, each separate image blob intersecting the moving plane is counted as a unique item.

A customer operating the terminal or a cashier operating the terminal on behalf of the customer places items on a scale or places a bag of items on a scale. The items can be within a bag or individually placed on the scale. When the customer or cashier initiates an item search within a transaction interface of the terminal, a depth image is captured, a 3D map is generated for the items, the 3D map is analyzed relative to a projected plane within the 3D map, a total number of items is counted using the projected plane and image blobs representing the items which intersect the plane, and a calculated item quantity is returned to a transaction manager of the terminal. The item quantity determined can be compared against a customer or cashier-entered quantity and when the two quantities do not match, the transaction manager can indicate through the transaction interface that the quantity was determined as X and ask the customer or cashier to confirm that X is correct. When the customer or the cashier indicates that the quantity is Y and not X, the transaction manager can suspend the transaction for an audit of the item quantity before the transaction is permitted to proceed.

As used herein an "operator" refers to a customer or a cashier. This is the individual that is operating the terminal during a checkout for a transaction of the customer. The terminal can include a self-service terminal for self-checkouts or a point-of-sale terminal for cashier-assisted checkouts.

FIG. 1 is a diagram of a system/platform 100 for determining item quantity at checkout, according to an example embodiment. Notably, the components are shown schematically in simplified form, with only those components relevant to understanding of the embodiments being illustrated.

Furthermore, the various components (that are identified in system/platform 100) are illustrated and the arrangement of the components are presented for purposes of illustration only. Notably, other arrangements with more or less components are possible without departing from the teachings of determining item quantities at checkout, presented herein and below.

System 100 includes a cloud/server 110 (hereinafter just "cloud 110") and one or more terminals 120. Cloud 110 includes at least one processor 111 and a non-transitory computer-readable storage medium 112 (hereinafter just "medium"), which includes instructions for a transaction manager 113, 3D image mapper 114, plane generator 115, and item counter 116. The instructions when provided to and executed by processor 111 cause processor 111 to perform the processing or operations discussed herein and below with respect to 113-116.

Each terminal 120 includes at least one processor 121 and a medium 122, which includes instructions for a transaction manager 123. The instructions when provided to and executed by processor 121 cause processor 121 to perform the processing or operations discussed herein and below with respect to transaction manager 123. The terminal 120 also includes at least a depth camera 125 to capture images with depth or 3D information and a scale 126. Optionally, the terminal 120 includes a 2D camera to capture images with 2D pixel data or information. The depth camera 125 includes any IR camera or 3D camera.

During a checkout transaction at terminal 120, an operator of terminal 120 initiates an item search through a transaction interface of transaction manager 123. This causes interaction and cooperation between transaction manager 123 and transaction manager 113. A product/item/produce search state for the transaction is communicated from transaction manager 123 to transaction manager 113. The operator enters a name for the item or browses for the name of the item through categories of items by interacting with the user interface. For example, the operator selects fruits from the user interface and the operator is presented with names and images of various fruits from which the operator can select or enter a name of a fruit or partial name. The items are placed on scale 126 when the produce search is initiated via the user interface. This causes depth camera 125 to capture depth or 3D image data for the items on the scale 126.

Transaction manager 123 provides the depth/3D image data for the items to transaction manager 113. Transaction manager 123 provides the depth image data to 3D image mapper 114, which generates a 3D map of the items on the scale 126 using the depth image data captured by depth camera 125.

In an embodiment, the depth camera 125 is an infrared (IR) sensor, which generates the depth image based on heat reflected off the items' surfaces and a top plate of the scale 126. Notably, when the items are in a bag, the heat from the surfaces of the items is still detectable from the depth image data. So, the depth image data still includes depth information for the items even if the items are contained within a non-transparent bag, which is placed on the scale 126. This is a substantial improvement over conventional approaches which attempt to rely on 2D images because the items include no 2D image data when occluded by a non-transparent bag.

3D image mapper 114 is capable of generating a 3D map or a 3D model of the depth information so that the items appear as continuous blobs of data as the items appear on the top plate of the scale 126 or as the items appear within a bag on the top plate of the scale 126. Plane generator 115 generates a horizontal plane that intersects the blobs within the 3D image map and/or generates a dynamic horizontal plane that dynamically moves down from a top of the 3D image map to a bottom of the 3D image map. Item counter 116 counts the blobs represented within the 3D image map based on intersections of each continuous blob with the plane. Item count manager provides an item quantity determination to transaction manager 113, which returns the item quantity back to transaction manager 123 for the transaction.

Transaction manager 123 obtains an item quantity entered by the operator for a given item name/code determined from the item search and compares the item quantity against the item quantity provided by transaction manager 113. When the item quantity entered by the operator matches the item quantity provided by transaction manager 113, transaction manager 123 continues with the transaction for the checkout. However, when the item quantity entered does not match the item quantity determined, transaction manager 123 requests that the operator confirm that the correct quantity is the item quantity provided by transaction manager 113 or the item quantity entered by the operator. When the operator attempts to assert that the correct item quantity is the operator's entered quantity, transaction manager 123 suspends the transaction or interrupts the transaction and requests an audit of the item quantity by authorized personnel of the store.

Figure 1B:
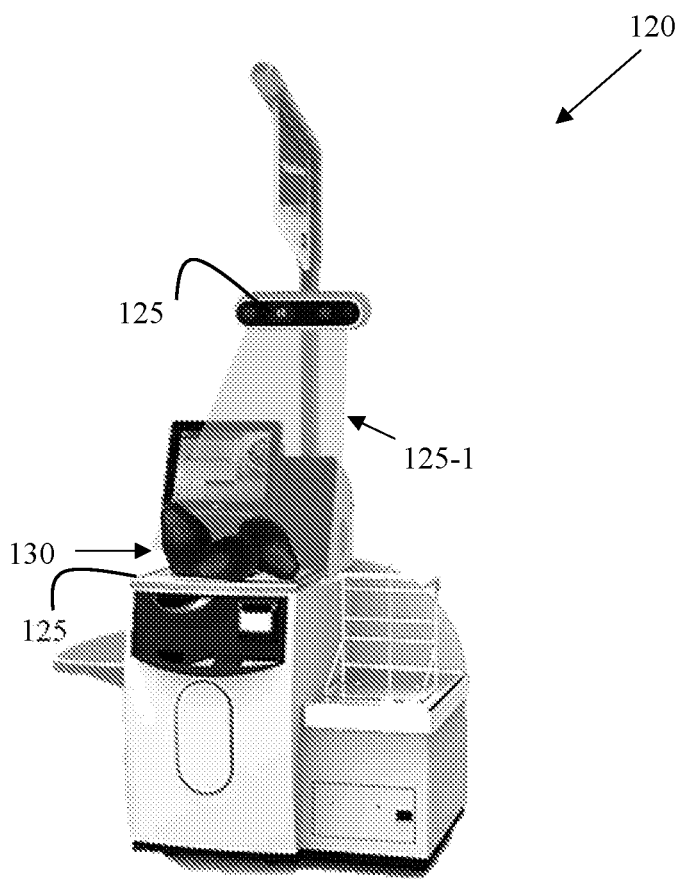
FIG. 1B is a diagram of a self-checkout equipped with an infrared camera used in the system of FIG. 1A for counting items during checkout, according to an example embodiment.

FIG. 1B is a diagram of a self-checkout terminal 120 equipped with an IR camera 125 used in the system of FIG. 1A for counting items during checkout, according to an example embodiment. IR camera 125 includes a field of view 125-1 projected downward onto the top plate of scale 126. Produce items 130 rests on the top plate and are captured in depth image information for an image provided by IR camera 125. The image is captured when a customer activates a produce search lookup within the transaction user interface of transaction manager 123 during a transaction and/or when the items are placed on the top plate.

Figure 1C:
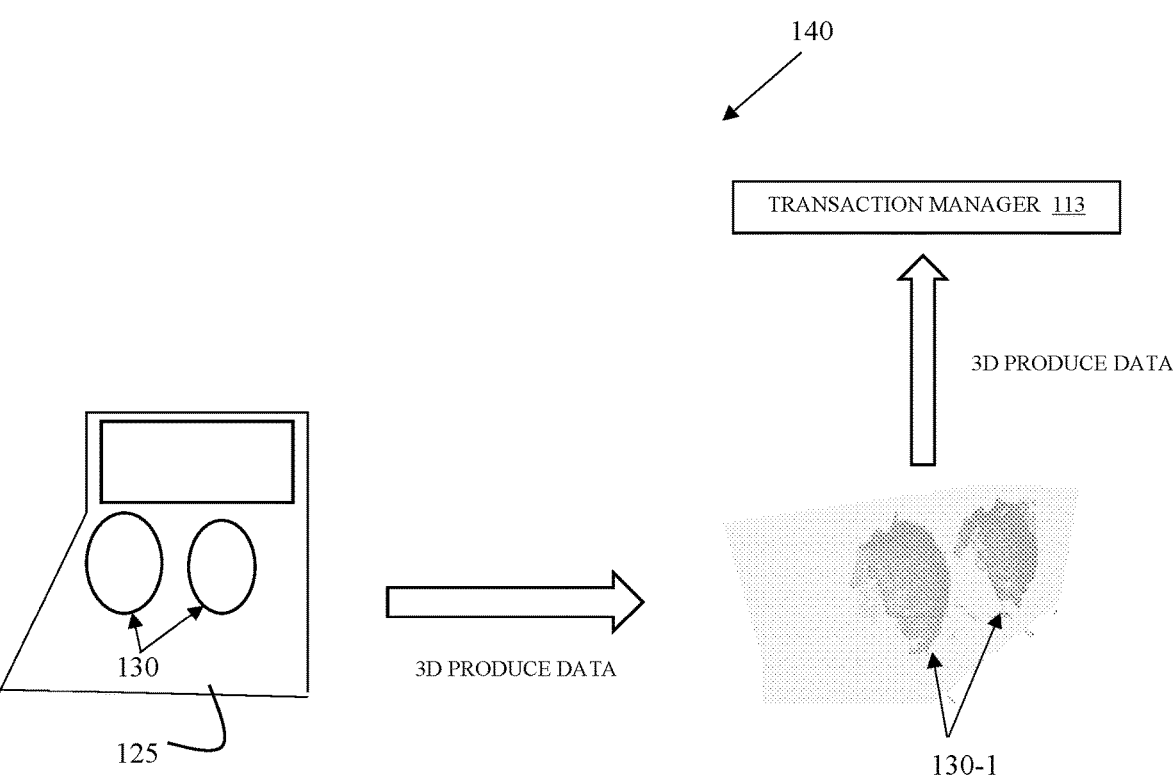
FIG. 1C is a graphic depicting a processing flow associated with counting items at checkout by the system of FIG. 1A, according to an embodiment.

FIG. 1C is a graphic depicting a processing flow 140 associated with counting items at checkout by the system of FIG. 1A, according to an embodiment. Two produce items 130 are placed on a top plate of scale 126. In an embodiment, as shown in FIG. 1C, the scale 126 is integrated into a bioptic scanner which is a combination scanner and scale 126.

Once the items 130 are placed on scale 126 and/or when the operator selects a produce item search within the transaction user interface of transaction manager 123, 3D or depth image information is captured in an image by depth or IR camera or sensor. The produce items 130 are depicted as blobs 130-1 of distinct continuous data within the 3D produce data. The 3D produce data is sent from transaction manager 123 to transaction manager 113. Transaction manager 113 provides the 3D produce data to 3D image mapper 114, which generates a 3D image map of the blobs 130-1 and provides the 3D image map to plane generator 115. Plane generator 115 generates a horizontal plane and/or moving dynamic horizontal plane through the blobs 130-1. Item counter 116 counts the total number of separate blobs 130-1 that were intersected by the plane and provides an item quantity back to transaction manager 113. Transaction manager 113 returns the item quantity back to transaction manager 123.

Figure 1D:
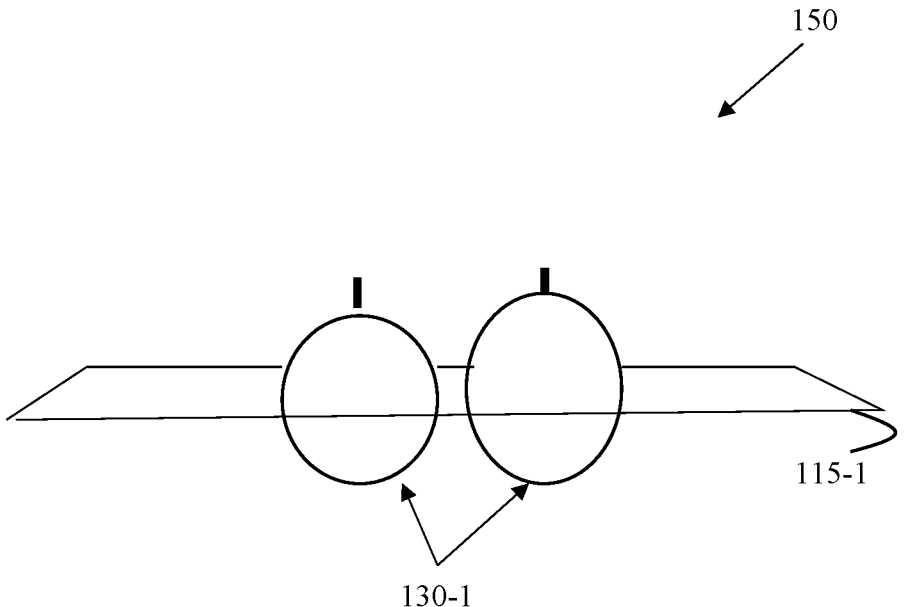
FIG. 1D is a graphic visually depicting an image-based item counting approach processed by the system of FIG. 1A, according to an example embodiment.

FIG. 1D is a graphic visually depicting an image-based item counting approach 150 processed by the system of FIG. 1A, according to an example embodiment. After the 3D image mapper 114 generates the 3D image map for the items shown in FIG. 1C, plane generator 115 generates a horizontal plane 115-1 that bisects the blobs 130-1 representing the produce items. Item counter 116 then counts each blob 130-1 intersected by the plane 115-1 projected into the 3D image map. A total unique blob count is the determined item quantity, which item counter 116 provides to transaction manager 113. Transaction manager 113 provides the item quantity back to transaction manager 123 for verification by transaction manager based on an operator entered item quantity before transaction manager 123 permits the transaction to continue at terminal 120.

Figure 1E:
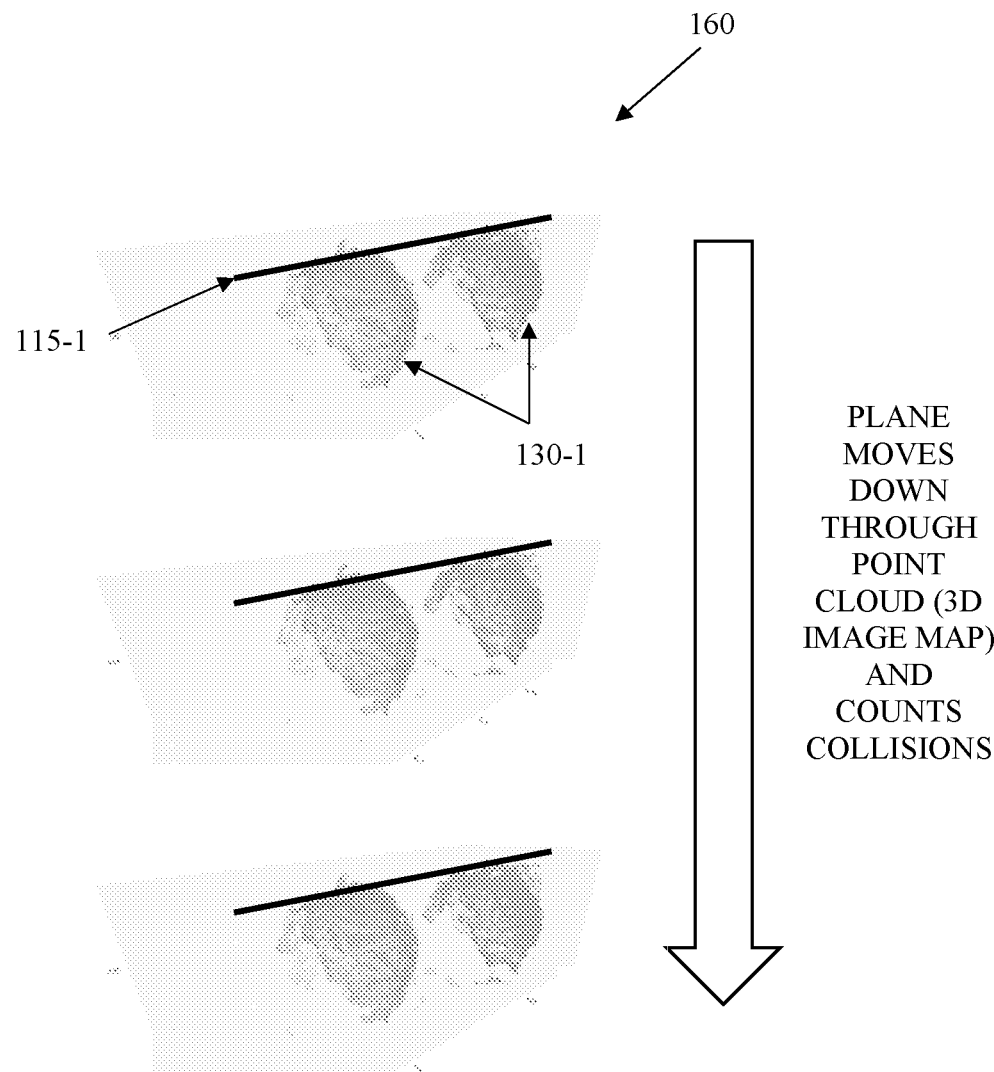
FIG. 1E is a graphic visually depicting another image-based item counting approach processed by the system of FIG. 1A, according to an example embodiment.

FIG. 1E is a graphic visually depicting another image-based item counting approach 160 processed by the system of FIG. 1A, according to an example embodiment. FIG. 1E illustrates a situation where the items on the scale 126 are stacked or partially stacked on each other within a bag. The 3D produce information or depth information includes representations of each of the items as independent blobs 130-1. Plane generator 115 generates a horizontal or substantially horizontal plane 115-1 that is projected onto and initially placed at a top of the 3D image map and then animated and moved from the top to the bottom of the 3D image map. Item counter 116 counts each independent blob 130-1 as the plane 115-1 is moved dynamically from the top to the bottom of the 3D image map. In this example, there are 6 blobs 130-1; therefore, item counter 116 returns an item count or item quantity of 6 to transaction manager 113. Transaction manager 113 returns the item quantity to transaction manager 123. Transaction manager 123 verifies the item quantity before permitting the transaction at terminal 120 to proceed or complete.

In an embodiment, plane generator 115 draws a best fit line horizontally through the blobs 130-1 of the 3D image map in order to project the horizontal plane 115-1 onto the 3D image map. In an embodiment, the 3D best fit line is animated to move from a top of the 3D image map to a bottom of the 3D image map.

In an embodiment, the 3D image mapper 114 includes threshold sizes for image blobs 130-1 representing items 130, such that when calculated sizes for the image blobs 130-1 are too small or too big relative to the threshold sizes, those blobs 130-1 are ignored and stripped from the 3D image map as potential noise present in the 3D image. In this way, blobs 130-1 that are too small or too large to be items can be removed from the 3D image map by 3D image mapper 114.

In an embodiment, the terminal 120 also includes a 2D camera 124. Transaction manager 113 in cooperation with other item recognition software modules on cloud 110 process the 2D images of items to recognize the items and assign an item code to the items, when the items are not in a non-transparent bag. The transaction manager 113 further provides the item code for the items to transaction manager 123 for verifying that the selected and/or entered item code by the operator through the transaction interface is correct. In this way, both the item code and the quantity of the items are verified via cloud 110 on behalf of terminal 120 during a checkout transaction being performed by an operator.

Figure 2:
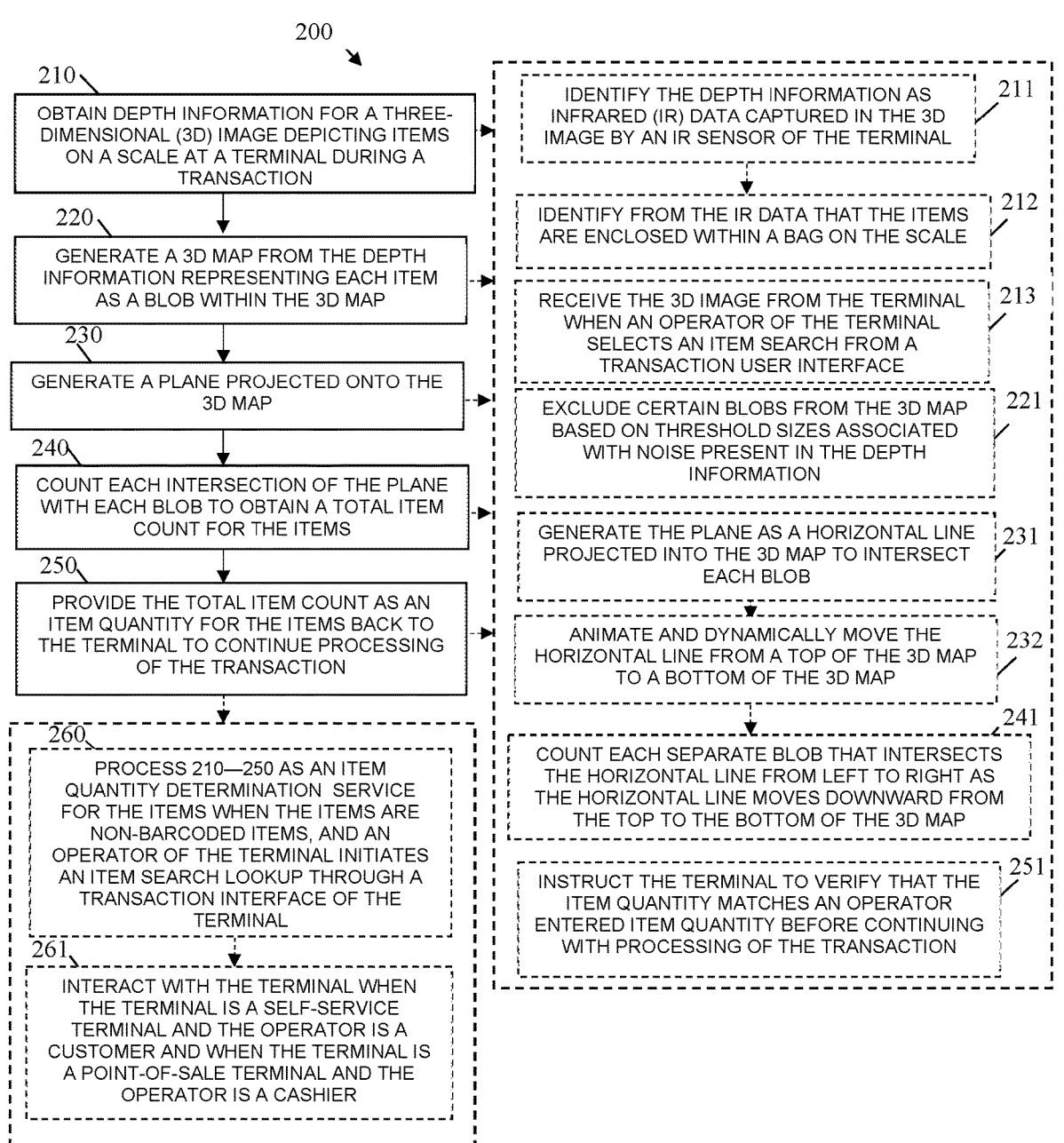
FIG. 2 is a flow diagram of a method for determining item quantity at checkout, according to an example embodiment.

The above-referenced embodiments and other embodiments are now discussed with reference to FIGS. 2 and 3. FIG. 2 is a diagram of a method 200 for determining item quantity at checkout, according to an example embodiment. The software module(s) that implements the method 200 is referred to as an "item quantity determination manager." The item quantity determination manager is implemented as executable instructions programmed and residing within memory and/or a non-transitory computer-readable (processor-readable) storage medium and executed by one or more processors of one or more devices. The processor(s) of the device(s) that executes the item quantity determination manager are specifically configured and programmed to process the item quantity determination manager. The item quantity determination manager may have access to one or more network connections during its processing. The network connections can be wired, wireless, or a combination of wired and wireless.

In an embodiment, the device that executes the item quantity determination manager is cloud 110. In an embodiment, the device that executes the item quantity determination manager is server 110. In an embodiment, the item quantity determination manager transaction manager 113, 2D image mapper 114, plane generator 115, and/or item counter 116.

At 210, the item quantity determination manager obtains depth information for a 3D image that depicts items on a scale 126 at a terminal 120 during a transaction. In an embodiment, at 211, the item quantity determination manager identifies the depth information as IR data captured in the 3D image by an IR sensor or IR camera 125 of the terminal 120. In an embodiment of 211 and at 212, the item quantity determination manager identifies from the IR data that the items are enclosed within a bag on the scale 126. In an embodiment, at 213, the item quantity determination manager receives the 3D images from the terminal 120 when an operator of the terminal 120 selects an item search from a transaction user interface of a transaction manager 123.

At 220, the item quantity determination manager generates a 3D map from the depth information representing each item as a blob within the 3D map. In an embodiment, at 221, the item quantity determination manager excludes certain blobs from the 3D map based on threshold sizes associated with noise present in the depth information.

At 230, the item quantity determination manager generates a plane projected into the 3D map. In an embodiment, at 231, the item quantity determination manager generates the plane as a horizontal line projected into the 3D map to intersect each blob. In an embodiment of 231 and at 232, the item quantity determination manager animates and dynamically moves the horizontal line from a top of the 3D map to a bottom of the 3D map.

At 240, the item quantity determination manager counts each intersection of the plane with each blob to obtain a total item count for the items. In an embodiment of 232 and 240, at 241, the item quantity determination manager counts each separate blob that intersects the horizontal line from left to right as the horizontal line moves downward from the top to the bottom of the 3D map.

At 250, the item quantity determination manager provides the total item count as an item quantity for the items sent back to the terminal 120 to continue processing of the transaction. In an embodiment, at 251, the item quantity determination manager instructs the terminal 120 to verify that the item quantity matches an operator-entered item quantity before continuing with the processing of the transaction.

In an embodiment, at 260, the item quantity determination manager (210-250) is processed as an item quantity determination service for the items when the items are non-barcoded items, and when an operator of the terminal initiates an item search lookup through a transaction interface of the terminal 120. In an embodiment, at 261, the item quantity determination manager interacts with the terminal 120 when the terminal 120 is a self-service terminal and the operator is a customer performing a self-service transaction or the item quantity determination manager interacts with the terminal 120 when the terminal is a point-of-sale terminal, and the operator is a cashier.

Figure 3:
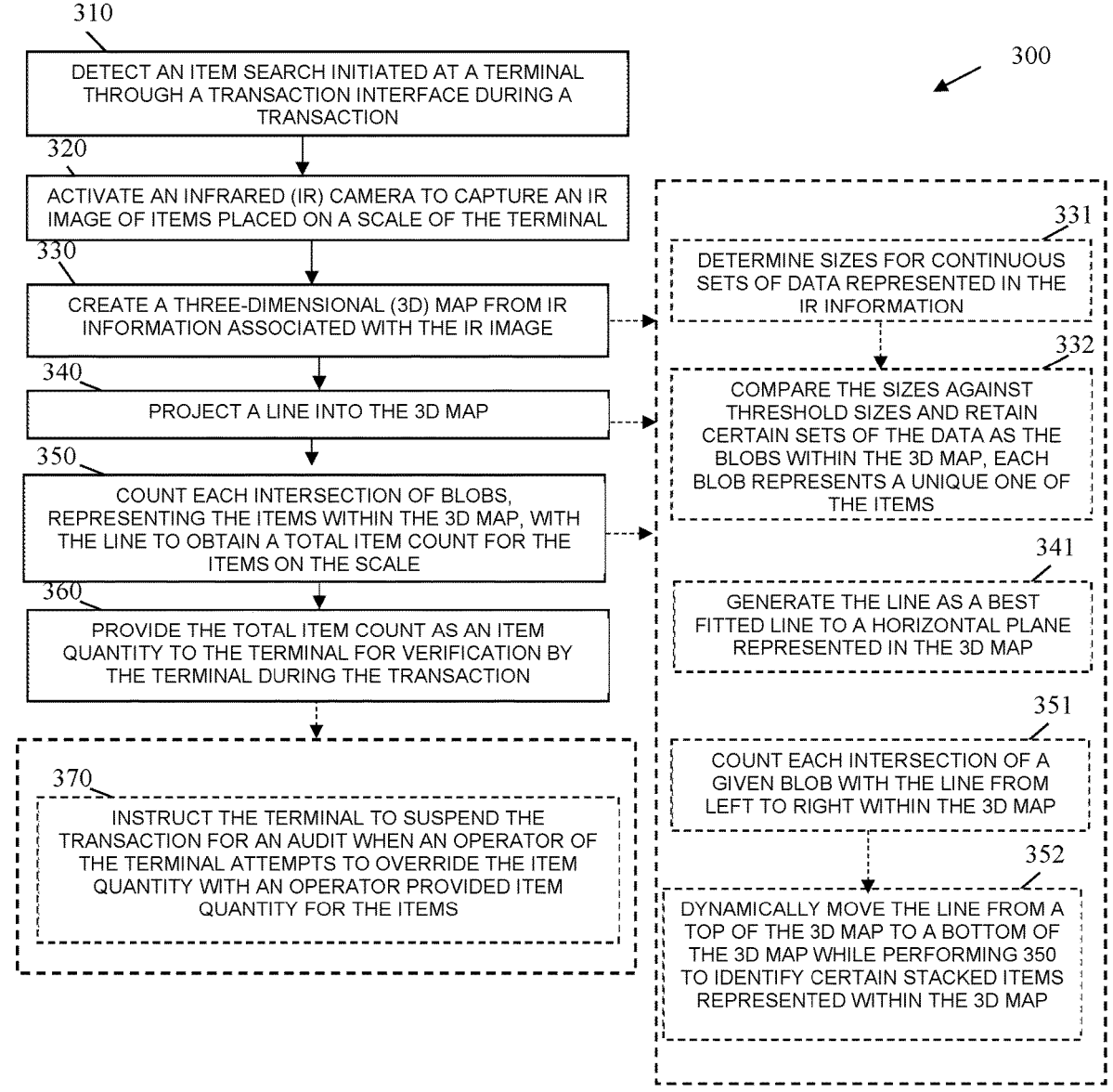
FIG. 3 is a flow diagram of another method for determining item quantity at checkout, according to an example embodiment.

FIG. 3 is a diagram of another method 300 for determining item quantity at checkout, according to an example embodiment. The software module(s) that implements the method 300 is referred to as a "transaction item quantity verification manager." The transaction item quantity verification manager is implemented as executable instructions programmed and residing within memory and/or a non-transitory computer-readable (processor-readable) storage medium and executed by one or more processors of one or more device(s). The processors that execute the transaction item quantity verification manager are specifically configured and programmed for processing the value transaction item quantity verification manager. The transaction item quantity verification manager may have access to one or more network connections during its processing. The network connections can be wired, wireless, or a combination of wired and wireless.

In an embodiment, the device that executes the transaction item quantity verification manager is cloud 110. In an embodiment, the device that executes the transaction item quantity verification manager is server 110. In an embodiment, the transaction item quantity verification manager executes on a combination of devices that include cloud 110 and terminal 120. In an embodiment, the transaction item quantity verification manager is transaction manager 113, 3D image mapper 114, plane generator 115, item counter 116, transaction manager 123, and/or method 200. The transaction item quantity verification manager presents another and, in some ways, enhanced processing perspective from that which was discussed above for system 100 and method 200.

At 310, the transaction item quantity verification manager detects an item search initiated at a terminal 120 through a transaction interface or a transaction user interface. The transaction user interface is processed by a transaction manager 123 of the terminal 120.

At 320, the transaction item quantity verification manager activates or causes activation of an IR camera 125 to capture an IR image or 3D image of items placed on a scale of the terminal 120 during a transaction. At 330, the transaction item quantity verification manager creates a 3D map from IR information associated with the IR image.

In an embodiment, at 331, the transaction item quantity verification manager determines sizes for continuous sets of data represented in the IR information. In an embodiment of 331 and at 332, the transaction item quantity verification manager compares the sizes against threshold sizes and retains certain sets of the data as blobs within the 3D map. Each blob represents a unique one of the items.

At 340, the transaction item quantity verification manager projects a line into and onto the 3D map. In an embodiment, at 341, the transaction item quantity verification manager generates the line as a best fitted horizontal plane represented in the 3D map.

At 350, the transaction item quantity verification manager counts each intersection of the blobs, representing the items within the 3D map, with the line to obtain a total item count for the items on the scale 126. In an embodiment, at 351, the transaction item quantity verification manager counts each intersection of a given blob with the line from left to right within the 3D map. In an embodiment of 351 and at 352, the transaction item quantity verification manager dynamically moves the line from a top of the 3D map while performing 350 to identify certain stacked items represented within the 3D map. In an embodiment, the items are stacked upon one another within a bag. In an embodiment, the bag is non-transparent.

At 360, the transaction item quantity verification manager provides the total item count as an item quantity to the terminal 120 for verification by the terminal 120 during the transaction. In an embodiment, at 370, the transaction item quantity verification manager instructs the terminal 120 to suspend the transaction for an audit when an operator of the terminal 120 attempts to override the item quantity with an operator-provided item quantity for the items.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, or as individual components. Some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   obtaining depth information for a three-dimensional (3D) image depicting items on a scale at a terminal during a transaction;
   generating a 3D map from the depth information representing each item as a blob within the 3D map;
   generating a plane projected onto the 3D map;
   counting each intersection of the plane with each blob to obtain a total item count for the items; and
   providing the total item count as an item quantity for the items back to the terminal to continue processing of the transaction.

2. The method of claim 1, wherein obtaining further includes identifying the depth information as infrared (IR) data captured in the 3D image by an IR sensor of the terminal.

3. The method of claim 2, wherein identifying further includes identifying from the IR data that the items are enclosed within a bag on the scale.

4. The method of claim 1, wherein obtaining further includes receiving the 3D image from the terminal when an operator of the terminal selects an item search from a transaction user interface.

5. The method of claim 1, wherein generating the 3D map further includes excluding certain blobs from the 3D map based on threshold sizes associated with noise present in the depth information.

6. The method of claim 1, wherein generating the plane further includes generating the plane as a horizontal line projected into the 3D map to intersect each blob.

7. The method of claim 6, wherein generating the plane further includes animating and dynamically moving the horizontal line from a top of the 3D map to a bottom of the 3D map.

8. The method of claim 7, wherein counting further includes counting each separate blob that intersects the horizontal line from left to right as the horizontal line moves downward from the top to the bottom of the 3D map.

9. The method of claim 1, wherein providing further includes instructing the terminal to verify that the item quantity matches an operator-entered item quantity before continuing with processing of the transaction.

10. The method of claim 1 further comprising, processing the method as an item quantity determination service for the items when the items are non-barcoded items, and an operator of the terminal initiates an item search through a transaction interface of the terminal.

11. The method of claim 10, wherein processing further includes interacting with the terminal when the terminal is a self-service terminal, and the operator is a customer performing a self-checkout and when the terminal is a point-of-sale terminal, and the operator is a cashier performing a cashier-assisted checkout.

12. A method, comprising:

detecting an item search initiated at a terminal through a transaction interface during a transaction;

activating an infrared (IR) camera to capture an IR image of items placed on a scale of the terminal;

creating a three-dimensional (3D) map from IR information associated with the IR image;

projecting a line into the 3D map;

counting each intersection of blobs, representing the items within the 3D map, with the line to obtain a total item count for the items on the scale; and providing the total item count as an item quantity to the terminal for verification by the terminal during the transaction.

13. The method of claim 12, wherein creating further includes determining sizes for continuous sets of data represented in the IR information.

14. The method of claim 13, wherein determining further includes comparing the sizes against threshold sizes and retaining certain sets of data represented in the IR information as the blobs within the 3D map, each blob represents a unique one of the items.

15. The method of claim 12, wherein projecting further includes generating the line as a best-fitted line to a horizontal plane represented in the 3D map.

16. The method of claim 12, wherein counting further includes counting each intersection of a given blob with the line from left to right within the 3D map.

17. The method of claim 16, wherein counting further includes dynamically moving the line from a top of the 3D map to a bottom of the 3D map while performing the counting to identify certain stacked items represented within the 3D map.

18. The method of claim 12, further comprising, instructing the terminal to suspend the transaction for an audit when an operator of the terminal attempts to override the item quantity within an operator-provided item quantity for the items.

19. A system, comprising:

at least one server comprising a processor and a non-transitory computer-readable storage medium;

the non-transitory computer-readable storage medium comprises executable instructions; and the executable instructions when executed on the processor, cause the processor to perform operations comprising:

generating a three-dimensional (3D) map from depth information associated with a 3D image that depicts items on a scale of a terminal during a checkout at the terminal, wherein each separate item is identified as a blob within the 3D map;

projecting a horizontal plane onto the 3D map to intersect each of the blobs;

determining an item quantity for the items by counting the intersections of the horizontal plane with the blobs within the 3D map; and providing the item quantity to the terminal during the checkout and instructing the terminal to suspend a transaction for an audit when an operator of the terminal attempts to override the item quantity with an operator-provided item quantity.

20. The system of claim 19, wherein the transaction is a self-service transaction, and the terminal is a self-service terminal or wherein the transaction is a cashier-assisted transaction, and the terminal is a point-of-sale terminal.

* * * * *